United States Patent Office 3,384,629
Patented May 21, 1968

3,384,629
METHOD OF SHORTSTOPPING CONJUGATED DIENE POLYMERIZATIONS
Charles W. Strobel, Bartlesville, Okla., assignor to Phillips Petroleum Company, a corporation of Delaware
No Drawing. Continuation-in-part of application Ser. No. 253,992, Jan. 25, 1963. This application Aug. 26, 1963, Ser. No. 304,655
16 Claims. (Cl. 260—94.2)

This invention relates to shortstopping or catalyst-inactivating agents for use in terminating the polymerization of conjugated dienes. In one aspect, it relates to an improved process for preparing conjugated diene polymers. In another aspect, it relates to a process for preventing or substantially reducing the tendency of conjugated diene polymers to cold flow in the unvulcanized state.

This application is a continuation-in-part of U.S. application Ser. No. 253,992, filed on Jan. 25, 1963, now abandoned.

There has been conducted in recent years a great deal of research work directed toward the production of improved rubbery polymers. Great advances have been recently made in this field as a result of the discovery of new catalyst systems. These catalyst systems are often described as being "stereospecific" since they are capable of polymerizing monomers, particularly conjugated dienes, to a certain geometric configuration. One of the products which has attracted widespread attention because of its outstanding and superior properties is a polybutadiene containing a high percentage, e.g., at least 85 percent, of cis 1,4-addition. Other polymers that have achieved considerable importance are those prepared by polymerizing a conjugated diene with a lithium-based catalyst. The physical properties of these polymers are of such a nature that they are particularly suitable for the fabrication of automobile and truck tires and other articles for which conventional synthetic polymers have heretofore been comparatively unsatisfactory. However, it has been found that certain of the conjugated diene polymers, including cis-polybutadiene, and polymers prepared with lithium-based catalysts, have a tendency to cold flow while in the unvulcanized or uncured state. Because of this tendency of the polymers to cold flow, a certain amount of difficulty has been encountered in the processing of the polymers, particularly in their packaging, shipping and storage. For example, is cracks or punctures develop in the package used in storing the polymers, the polymer will flow from the package with a resulting product loss or contamination and sticking together of stacked packages. Accordingly, it is highly desirable to provide a method of reducing the tendency of these rubbery polymers to cold flow when in the unvulcanized state.

It is an object of this invention to provide an improved process for preparing rubbery polymers whereby the products produced have a reduced tendency to cold flow.

Another object of the invention is to provide a method for stortstopping or terminating the polymerization of conjugated dienes.

A further object of the invention is to provide a shortstopping method which results in the production of a polymer having lower cold flow as compared to one using certain other shortstopping agents.

Other and further objects and advantages of the invention will become apparent to those skilled in the art upon consideration of the accompanying disclosure.

The present invention is concerned with a method for inactivating the organometal-type catalyst employed in the polymerization of conjugated dienes, e.g., a catalyst which forms on mixing materials comprising an organometal and a heavy metal compound, or a lithium-based catalyst. It has been discovered that the problem of cold flow in rubbery polymers of conjugated dienes can be substantially reduced by shortstopping the polymerization reaction with an organic perioxide or hydroperoxide. Rubbery polymers of conjugated dienes having Mooney values of about 10 to 60 (ML–4 at 212° F.) can be readily obtained according to this method without serious problems in handling and processing.

When polymerizing conjugated dienes with an organometal-type catalyst, the reaction is usually terminated or shortstopped when the conversion has reached the desired level by the addition to the polymerization mixture of a catalyst-inactivating agent. Compounds which have been used to inactivate the catalyst include materials such as water, alcohols and rosin acids. These materials are effective shortstopping agents, but the product produced often has a tendency to cold flow when in the unvulcanized state. Accordingly, it was completely unexpected when it was found that the organic peroxides of this invention, in addition to being effective shortstopping agents function to reduce the tendency of the polymer to cold flow. Furthermore, the valuable properties characteristic of the vulcanizates of conjugated diene polymers are retained by proceeding according to the present invention.

As stated hereinbefore, the peroxides used in the method of this invention are selected from the group consisting of organic peroxides and organic hydroperoxides. The organic peroxides and hydroperoxides preferably contain from 4 to 40 carbon atoms per molecule and have one or more peroxy groups. Also, the peroxides which are preferably used in the practice of the invention decompose at a comparatively low temperature, e.g., at a temperature in the range of 250 to 350° F. The organic peroxides suitable for use can also be represented by the formula R—O—O—R while the hydroperoxides can be represented by the formula H—O—O—R, wherein R is selected from the group consisting of an acyl radical, a saturated acylclic radical, an olefinically unsaturated acyclic radical, a saturated cyclic radical, an olefinically unsaturated cyclic radical, and an aromatic radical, and wherein said R radical can be substituted with a member selected from the group consisting of a halogen, a hydroxy radical and a R'O-radical wherein R' is selected from the group consisting of an acyl radical, a saturated acyclic radical, an olefinically unsaturated acyclic radical, a saturated cyclic rdical, an olefinically unsaturated cyclic radical, and an aromatic radical. It is to be understood that mixed compounds can be used, e.g., organic peroxides in which one of the oxygens of the peroxy group is joined to a hydrocarbon group, such as alkyl or cycloalkyl, while the other oxygen is joined to an acyl group. Peroxy compounds which are half-esters or diesters of dicarboxylic acids are also applicable as well as monoperoxy compounds derived from dicarboxylic acids. Examples of suitable peroxides include the following: methyl n-propyl peroxide, diethyl peroxide, ethyl isopropyl peroxide, di-tert-butyl peroxide, di-n-hexyl peroxide, n-hexyl n-decyl peroxide, dieicosyl peroxide, dicyclohexyl peroxide, dicyclopentyl peroxide, bis(2,4,6-trimethylcyclohexyl) peroxide, bis(3,5-dichlorocyclohexyl) peroxide, bis(4-phenylcyclohexyl) peroxide, bis(2-cyclohexenyl) peroxide, bis(4 - methyl - 2 - hexenyl) peroxide, bis(4-octenyl) peroxide, diacetyl peroxide, dipropionyl peroxide, dilauroyl peroxide, dibenzoyl peroxide, dicrotonyl peroxide, dibenzyl peroxide, dicumyl peroxide, methyl 2-n-propyl-3-butenyl peroxide, bis(alpha-ethylbenzyl)peroxide, bis[diisopropyl-(4-isopropylphenyl)methyl] peroxide, bis[dimethyl - (4 - tert - butylphenyl)methyl] peroxide, benzyl alpha-methylbenzyl peroxide, bis(4-chlorobenzoyl) peroxide, bis(2,4-dichlorobenzoyl) peroxide, bis(2-propoxy-n-hexyl) peroxide, n-pentyl 5,8-diphenyldodecyl peroxide, bis(9,10-dihydroxydecyl) peroxide, 2,5-bis(tert-butylperoxy)-2,5-dimethylhexane, bis(2-hydroxyheptyl) peroxide, tert-butyl hydroperoxide, dodecyl hydroperoxide, eicosyl hydroperoxide, triacontanyl hydroperoxide, 4-methylcyclohexyl hydroperoxide, phenylcyclohexyl hydroperoxide, 3-cyclohexenyl hydroperoxide, 3-phenyl-2-cyclohexenyl hydroperoxide, 4-cyclopentyl-n-butyl hydroperoxide, cumene hydroperoxide (dimethylphenylhydroperoxymethane), diisopropylbenzene hydroperoxide [dimethyl - (4 - isopropylphenyl)hydroperoxymethane], (4-ethoxyphenyl)methyl hydroperoxide, di-n-hexyl-4-hydroxyphenyl)hydroperoxymethane, dimethyl-(3-methoxyphenyl)hydroperoxymethane, peroxybenzoic acid, peroxybutyric acid, peroxydodecanoic acid, tert-butyl peroxybenzoate, di-tert-amyl diperoxyphthalate tert-dodecyl peroxyacetate, the OO-tert-butyl half ester of peroxymaleic acid

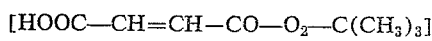

[HOOC—CH=CH—CO—O$_2$—C(CH$_3$)$_3$]

and the OO-n-amyl half ester of peroxyphthalic acid. Peroxides formed by the oxidation of terpene hydrocarbons such as pinane, alpha-pinene, p-menthane, and turpentine can also be used.

The amount of organic peroxide or hydroperoxide empolyed is generally in the range of 1 to 25 millimoles, preferably from 2 to 20 millimoles, per 100 grams of monomer charged to the polymerization. Larger or smaller quantities can be used if desired, the amounts being determined by the activity of the peroxide-type compound and the temperature and time of treatment. These compounds are effective shortstopping agents at whatever temperature is employed for the polymerization. Sufficient contact time with the polymer solution must, however, be allowed in order to achieve optimum reduction in cold flow. The time is dependent, at least to a certain extent, upon the temperature, a longer time generally being required as the temperature is lowered. Ordinarily the time will be in the range of 5 minutes to 50 hours.

In general, the shortstopping agents of this invention are applicable to polymerization processes in which a conjugated diene is polymerized with a catalyst comprising an organometal compound, e.g., a catalyst which forms on mixing materials comprising an organometal and a heavy metal, or a lithium-based catalyst. Conjugated dienes that are used generally contain from 4 to 12, preferably from 4 to 8 carbon atoms per molecule. Examples of suitable monomers include 1,3-butadiene, isoprene, piperylene, 2,3 - dimethyl-1,3-butadiene, 2 - methyl-1,3-hexadiene, 1,3-octadiene, 1,3-dodecadiene, 2,5-dimethyl-1,3-decadiene, 4,5-diethyl-1,3-octadiene, and the like. These conjugated dienes can be polymerized to form homopolymers or mixtures of the dienes can be polymerized to form copolymers. The conjugated dienes can also be polymerized with one or more copolymerizable vinyl-substituted aromatic hydrocarbons, in which the vinyl group is attached to a nuclear carbon atom. It is to be understood that a compound having a substituent on the alpha carbon atom, such as alpha-methylstyrene, is not applicable to the process. Examples of vinyl-substituted aromatic hydrocarbons which are usually preferred are styrene, 1-vinylnaphthalene and 3-methylstyrene (3-vinyltoluene). Examples of other compounds which can be advantageously utilized include 3,5-diethylstyrene, 4-n-propylstyrene, 2,4,6 - trimethylstyrene, 4 - dodecylstyrene, 3 - methyl - 5 - n - hexylstyrene, 4-cyclohexylstyrene, 4 - phenylstyrene, 2-ethyl-4-benzylstyrene, 4-p-tolylstyrene, 3,5-diphenylstyrene, 2,3,4,5-tetraethylstyrene, 3-(4-n-hexylphenyl)styrene, 3-ethyl-1-vinylnaphthalene, 6-isopropyl - 1 - vinylnaphthalene, 3,6-di-p-tolyl-1- vinylnaphthalene, 6 - chlorohexyl-1-vinylnaphthalene, 8-phenyl-1-vinylnaphthalene, 7-dodecyl-2-vinylnaphthalene, and the like. Further details on the preparation of rubbery diene polymers with organometal-type catalysts are disclosed in U.S. Patent No. 2,979,488.

The use of the shortstopping agents of this invention is particularly applicable to the process for preparing a polybutadiene containing a high percentage of cis 1,4-addition. The cis-polybutadiene can be prepared by polymerizing butadiene with a catalyst system which forms on mixing materials comprising an organometal compound and iodine, present either in the free or combined state. This polymerization system produces a cis-polybutadiene having outstanding physical properties when in the cured state but having a tendency to cold flow in the unvulcanized state. The term "cis-polybutadiene," as used herein, is intended to include a polybutadiene containing at least 85 percent cis 1,4-addition, e.g., from 85 to 98 percent and higher.

The cis-polybutadiene can be prepared by polymerizing 1,3-butadiene with any one of a large number of different stereospecific catalyst systems. It is usually preferred to employ a catalyst which is selected from the group consisting of (1) a catalyst which forms on mixing an organometal compound having the formula $R_mM$, wherein R is an alkyl, cycloalkyl, aryl, alkaryl, aralkyl, alkylcycloalkyl or cycloalkylalkyl radical, M is aluminum, mercury, zinc, beryllium, cadmium, magnesium, sodium or potassium, and $m$ is equal to the valence of the metal M, and titanium tetraiodide, (2) a catalyst which forms on mixing an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst which forms on mixing an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst which forms on mixing an organo compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst which forms on mixing an organo compound having the formula $R_xM'''$, wherein R, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine;

tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutyl aluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is ordinarily carried out in the presence of a hydrocarbon diluent which is not deleterious to the catalst system. Examples of suitable diluents include aromatic, paraffinic, and cycloparaffiinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromine and aluminum iodide, them ol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e. organometal and halogen-containing component, is usually in the range of 0.01 to 10 weight percent, preferably in the range of 0.01 to 5 percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

The use of the shortstopping agents of this invention is also especially applicable to a process for polymerizing conjugated dienes with lithium metal and/or an organolithium compound. The polybutadienes prepared with a lithium-based catalyst generally contain from 35 to 48 percent cis 1,4-addition, from 45 to 55 percent trans-1,4 addition and from 6 to 10 percent 1,2-addition. The present invention is particularly applicable to low inherent viscosity polybutadienes prepared by this method. Such polymers generally have an inherent viscosity in the range of 0.75 to 3. While the low inherent viscosity polybutadienes possess outstanding physical properties, they have a tendency to cold flow when in the unvulcanized state.

Organolithium compounds suitable for use in the polymerization have the formula $RLi_x$, wherein R is a hydrocarbon radical selected from the group consisting of aliphatic, cycloaliphatic and aromatic radicals and $x$ is an integer from 1 to 4, inclusive. The R is the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, 1,2,3,5-tetralithio-4-hexylanthracene, and the like.

The process used in preparing the conjugated diene polymers with a lithium-based catalyst can be conducted at a temperature in the range of −100 to 250° F., preferably at a temperature in the range of 0 to 180° F. The polymerization reaction can be carried out under autogenous pressure. It is usually desirable to operate at a pressure sufficient to maintain the reaction mixture in the liquid phase. The polymerization is conducted in the presence of a hydrocarbon diluent similar to that employed in the polymerization process as described hereinbefore. The actual pressure used in the process will depend upon the particular diluent employed and the temperature at which the polymerization is to be conducted.

A conjugated diene polymer having a desired inherent viscosity can be readily prepared by varying the concentration of the lithium-based catalyst. For example, with a completely dry system and no other impurities present to destroy the organolithium compound, about 2.5 millimoles of catalyst per 100 grams of monomer is generally required to give a polymer having an inherent viscosity of 0.75, and about 0.30 millimole of catalyst per 100 grams of monomer is generally required for the production of a polymer having an inherent viscosity of 3.0. It has been found that for practical operations approximately 0.3 millimole or more of catalyst per 100 grams of monomer is frequently needed as a scavenger for the system.

The shortstopping agents of this invention can also be advantageously employed in a process for preparing random copolymers with an organolithium catalyst. In accordance with this process, at least two members selected from the group consisting of 1,3-butadiene, isoprene, piperylene, vinyl-substituted aromatic hydrocarbons, vinyl halides, vinylidene halides, esters of acrylic acid and esters of homologs of acrylic acids are contacted with an organolithium compound in the presence of a solvent mixture comprising (1) a hydrocarbon selected from the group consisting of aromatic hydrocarbons, paraffins and cycloparaffins, and (2) a polar organic compound, such as an ether, thioether or tertiary amine. The details for carrying out the process for preparing random copolymers are disclosed in U.S. Patent No. 2,975,160.

Various materials are known to be detrimental to the catalysts employed in preparing this conjugated diene polymer. These materials include carbon dioxide, oxygen and water. It is usually desirable, therefore, that the monomer and diluent be free of these materials as well as other materials which may tend to inactivate the catalyst. Furthermore, it is desirable to remove air and moisture from the reaction vessel in which the polymerization is to be conducted.

At the conclusion of the polymerization, the peroxide shortstopping agent is added. While the reaction can be terminated at any temperature within the range specified for polymerization, for optimum reduction in cold flow a temperature of at least 50° F. is ordinarily used and it is preferably 100° F. or higher. The shortstopping agent can be added at whatever temperature is employed for the polymerization and the temperature then adjusted, if necessary, to give the desired reduction in cold flow, or the temperature can be adjusted prior to adding the shortstopping agent. The reaction mixture is agitated throughout the treating period to facilitate contact of the peroxide with the polymer.

The following examples illustrate specific embodiments of my invention and should not be considered unduly limiting. In each run, examination of the polymer showed 90 to 95 percent cis 1,4-addition.

The microstructure of each cis-polybutadiene referred to in the examples was determined by dissolving a sample of the polymer in carbon disulfide so as to form a solution having 25 grams of polymer per liter of solution. The infrared spectrum of the solution (percent transmission) was then determined in a commercial infrared spectrophotometer.

The percent of the total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

Example I

The following recipe was employed for the polymerization of butadiene:

| | |
|---|---:|
| Toluene _____ Parts by weight__ | 1000 |
| 1,3-butadiene _____ do____ | 100 |
| Triisobutylaluminum (TBA) (2.75 mhm.) _____ do____ | 0.543 |
| Iodine ($I_2$) (0.80 mhm.) _____ do____ | 0.203 |
| Titanium tetrachloride (TTC) (0.46 mhm.) _____ do____ | 0.087 |
| TBA/$I_2$/TTC mole ratio _____ | 6/1.75/1 |
| Temperature, ° F. _____ | 41 |
| Time, hours _____ | 16–18 |

Toluene was charged first, the reactor was purged with nitrogen, butadiene was added, and then the triisobutylaluminum, iodine, and titanium tetrachloride in the order named. Three runs were made. At the close of the polymerization period the reaction mixtures were allowed to warm to room temperature. One run was shortstopped with isopropyl alcohol and used as a control. Different amounts of p-menthane hydroperoxide were added to the other runs after which the temperature was increased to 122° F. and the mixtures were agitated at this temperature for one hour. The polymers from these and the control runs were coagulated with isopropyl alcohol, separated, 0.5 part by weight per 100 parts rubber of 2,2′-methylene-bis(4-methyl-6-tert-butylphenol) was incorporated into each wet polymer, and the products were dried at 140° F. Inherent viscosity, gel, and cold flow were determined. Results are presented in the following table:

| Run No. | p-Menthane Hydroperoxide | | Inh. Visc.[2] | Gel, percent[3] | Cold Flow Δ1 Hr., mm.[4] |
|---|---|---|---|---|---|
| | mhm. | phm.[1] | | | |
| 1 | 0 | 0 | 2.23 | 0 | 7.1 |
| 2 | 7.2 | 2.0 | 2.31 | 0 | 5.8 |
| 3 | 18.0 | 5.0 | 2.47 | 0 | 4.2 |

NOTE.—Mhm.=millimoles per 100 parts monomer; phm.=parts by weight per 100 parts monomer.

[1] The hydroperoxide used analyzed 55 percent purity.
[2] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.
[4] Values determined by measuring the distance that a brass rod (0.25 x 7 inches) sank into sample at the timed interval designated at room temperature.

These data show that the hydroperoxide-terminated products had much lower cold flow than the control.

Example II

Three runs were made for the polymerization of butadiene using the recipe and procedure of Example I except that these runs were terminated with variable quantities of benzoyl peroxide. Results of inherent viscosity, gel, and cold flow determinations are shown in the following table:

| Run No. | Benzoyl Peroxide | | Inh. Visc.[2] | Gel, percent[3] | Cold Flow Δ3 Hr., mm[4] |
|---|---|---|---|---|---|
| | Mhm. | Phm.[1] | | | |
| 1 | 2.0 | 0.48 | 2.74 | 0 | 4.8 |
| 2 | 4.0 | 0.96 | 2.49 | 0 | 1.5 |
| 3 | 8.0 | 1.92 | 2.79 | 0 | 0.7 |

See footnotes at end of preceding table.

See footnotes at the end of preceding tables.

Reference can be made to Example I for results on a control run. Again the data demonstrate that cold flow can be reduced by terminating the reactions with a peroxide-type compound.

Example III

The following recipe was employed for the polymerization of 1,3-butadiene:

| | |
|---|---|
| 1,3-butadiene _____Parts by weight__ | 100 |
| Cyclohexane _____do____ | 780 |
| n-Butyllithium _____do____ | 0.067 |
| Temperature, ° F. _____ | 122 |
| Time, hr. _____ | 5.5 |

Cyclohexane was charged first after which the reactor was purged with nitrogen. Butadiene was then added followed by a cyclohexane solution of n-butyllithium. The reactor was then tumbled in a constant temperature bath at 122° F. for 5.5 hours. Two runs were carried out in this manner. One run used as the control was shortstopped and the polymer coagulated with isopropyl alcohol containing 10 weight percent of 2,2'-methylene-bis-(4-methyl-6-tert-butylphenol) so as to give one part by weight of antioxidant per 100 parts by weight of polymer. After drying, the rubber recovered in the control run was found to have a cold flow of 15 mg./min. as determined by the extrusion method. In this method, the rubber is extruded through a ¼" orifice at 3.5 p.s.i. pressure and a temperature of 122° F. After allowing 10 minutes to reach steady state, the rate of extrusion is measured and reported in milligrams per minute.

In the run carried out according to the invention, 0.008 part by weight of dibenzoyl peroxide per 100 parts by weight of rubber was added as a shortstopping agent to the polymerization mixture at the end of the reaction period. Thereafter, the isopropyl alcohol-antioxidant mixture described above was charged in order to coagulate the polymer. After drying, the recovered polymer was found to have a cold flow of 1.2 mg./min. as determined by the extrusion method.

The runs described above clearly demonstrate that the tendency of an organolithium-catalyzed polybutadiene to cold flow can be greatly reduced by terminating the polymerization reaction with a peroxide-type compound.

As many possible embodiments can be made of this invention without departing from the scope thereof, it is to be understood that all matter herein set forth is to be interpreted as illustrative and not as unduly limiting the invention.

I claim:

1. In a process wherein a polymerization mixture is formed by polymerizing a conjugated diene with a lithium-based catalyst, the improvement which comprises adding to said polymerization mixture as a shortstopping agent an organic peroxide and thereafter coagulating and recovering the shortstopped polymer directly from the shortstopping step.

2. The process of claim 1 wherein the amount of peroxide added is in the range of 1 to 25 millimoles per 100 grams of conjugated diene charged to the polymerization.

3. The process of claim 2 wherein the temperature following addition of the peroxide is maintained at a temperature of at least 50° F. for a time of at least 5 minutes.

4. The process of claim 1 wherein said peroxide contains 4 to 40 carbon atoms per molecule.

5. The process of claim 1 wherein said peroxide is p-menthane hydroperoxide.

6. The process of claim 1 wherein said peroxide is benzoyl peroxide.

7. The process of claim 1 wherein said peroxide is di-tert-butyl peroxide.

8. The process of claim 1 wherein said peroxide is dicumyl peroxide.

9. The process of claim 1 wherein said peroxide is bis (4-chlorobenzoyl) peroxide.

10. In a process wherein a polymerization mixture is formed by polymerizing 1,3-butadiene with a lithium-based catalyst, the improvement which comprises adding to said polymerization mixture as a shortstopping agent an organic peroxide and thereafter coagulating and recovering the shortstopped polymer directly from the shortstopping step.

11. The process of claim 10 wherein said peroxide is added in the amount of 1 to 25 millimols per 100 grams of 1,3-butadiene charged to the polymerization.

12. The process of claim 10 wherein said peroxide is p-menthane hydroperoxide.

13. The process of claim 12 wherein the polymerization mixture and peroxide are contacted at room temperature for approximately one hour.

14. The process of claim 10 wherein said peroxide is benzoyl peroxide.

15. The process of claim 14 wherein the polymerization mixture and peroxide are contacted at room temperature for approximately one hour.

16. In a process for polymerizing 1,3-butadiene in the presence of an organolithium compound having the formula $RLi_x$, wherein R is a hydrocarbon radical selected from the group consisting of aliphatic, cycloaliphatic and aromatic radicals, and $x$ is an integer from 1 to 4, inclusive, the amount of said organolithium compound being in the range of 0.30 to 2.5 millimols per 100 grams of 1,3-butadiene, the improvement which comprises adding to the polymerization mixture as a shortstopping agent a peroxide containing 4 to 40 carbon atoms having a formula selected from the group consisting of R—O—O—R and R—O—O—H where R is individually selected from the group consisting of an acyl radical, a saturated acylic radical, an olefinically unsaturated acyclic radical, a saturated cyclic radical, an olefinically unsaturated cyclic radical, and an aromatic radical, and wherein said R radical can be substituted with a member selected from the group consisting of a halogen, a hydroxy radical and a R'O-radical, wherein R' is selected from the group consisting of an acyl radical, a saturated acyclic radical, an olefinically unsaturated acyclic radical, a saturated cyclic radical, an olefinically unsaturated cyclic radical, and an aromatic radical, the amount of peroxide employed being in the range of 1–25 millimols per 100 grams of 1,3-butadiene charged and thereafter coagulating and recovering the shortstopped polymer directly from the shortstopping zone.

References Cited

UNITED STATES PATENTS

| | | | |
|---|---|---|---|
| 3,213,075 | 10/1965 | Sonnenfeld | 260—94.4 |
| 3,268,501 | 8/1966 | Crouch et al. | 260—94.7 |
| 3,070,589 | 12/1962 | Kirch et al. | 260—94.9 |
| 2,979,488 | 4/1961 | Carpenter | 260—94.3 |
| 3,182,052 | 5/1964 | Naylor | 260—94.3 |

JOSEPH L. SCHOFER, *Primary Examiner.*

H. I. CANTOR, W. F. HAMROCK, *Assistant Examiners.*